(No Model.)  
2 Sheets—Sheet 1.
P. BIETH.
ICE VELOCIPEDE.
No. 579,510.  
Patented Mar. 23, 1897.
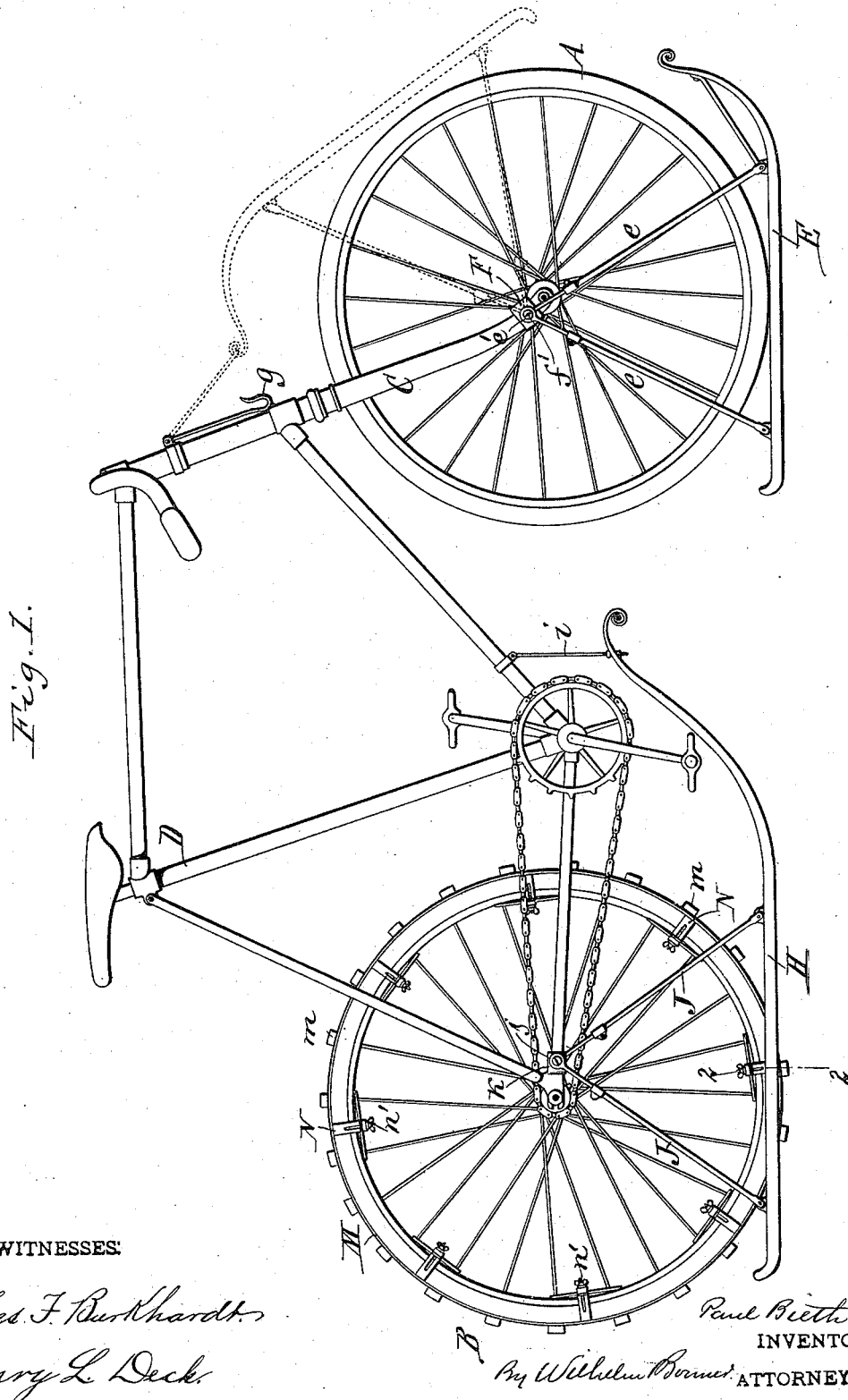
WITNESSES:  
Chas. F. Burkhardt  
Henry L. Deck
Paul Bieth  
INVENTOR.  
By Wilhelm Bonner ATTORNEYS.

(No Model.) 2 Sheets—Sheet 2.
P. BIETH.
ICE VELOCIPEDE.
No. 579,510. Patented Mar. 23, 1897.
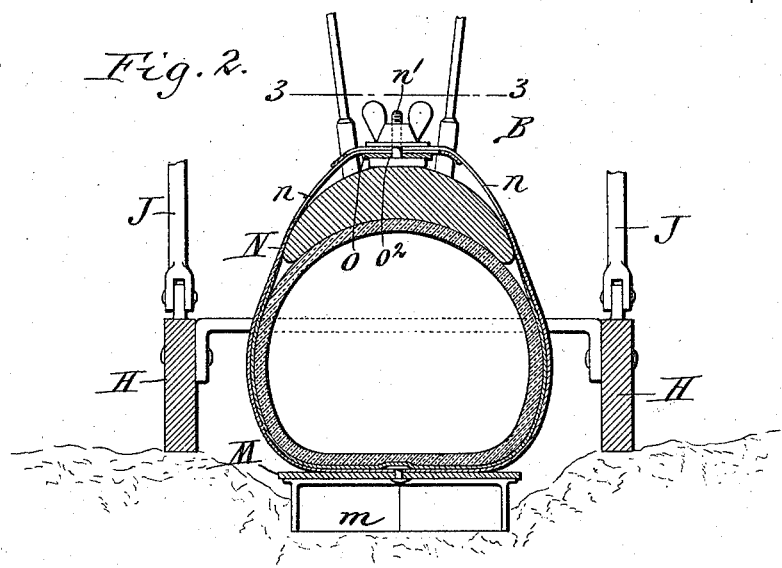
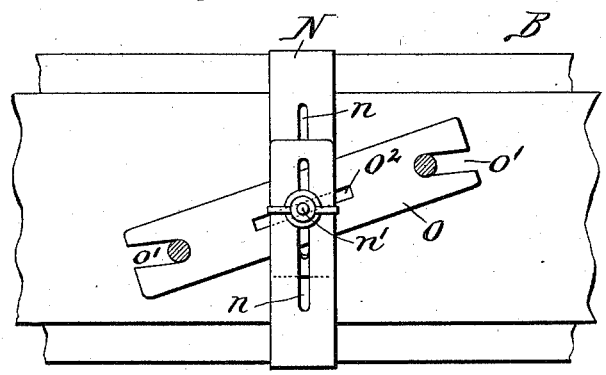
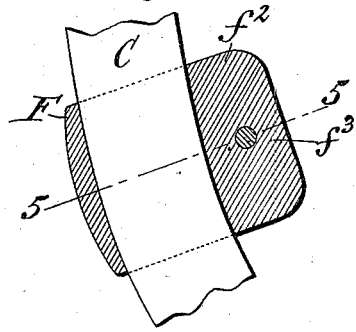
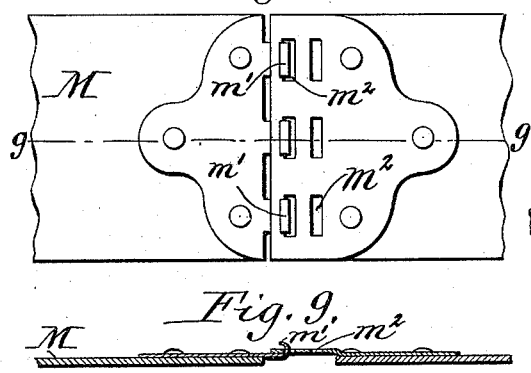
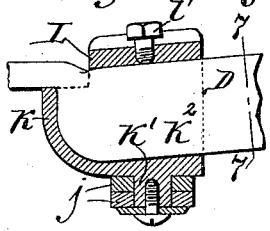
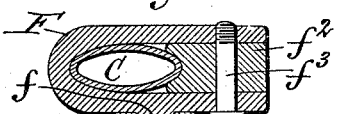
WITNESSES. Chas. F. Burkhardt, Henry L. Deck
INVENTOR. Paul Bieth
By Wilhelm Bonner ATTORNEYS.

UNITED STATES PATENT OFFICE.

PAUL BIETH, OF BUFFALO, NEW YORK.

ICE-VELOCIPEDE.

SPECIFICATION forming part of Letters Patent No. 579,510, dated March 23, 1897.

Application filed March 26, 1896. Serial No. 584,898. (No model.)

*To all whom it may concern:*

Be it known that I, PAUL BIETH, a citizen of the United States, residing at the city of Buffalo, in the county of Erie and State of New York, have invented a new and useful Improvement in Velocipedes, of which the following is a specification.

This invention relates to a velocipede which can be propelled over ordinary roads or over snow and ice.

The objects of my invention are to so organize the velocipede that the same can be easily converted into a land or an ice and snow velocipede and to improve the means whereby the gripping devices may be readily attached to or detached from the driving-wheel.

In the accompanying drawings, consisting of two sheets, Figure 1 is a side elevation of a bicycle provided with my improvements. Fig. 2 is a cross-section, on an enlarged scale, of the rear runners and adjacent portion of the rear wheel, taken in line 2 2, Fig. 1. Fig. 3 is a sectional inside view taken in line 3 3, Fig. 2. Fig. 4 is a fragmentary vertical section of one of the clips whereby the front runner is connected with the front fork. Fig. 5 is a cross-section in line 5 5, Fig. 4. Fig. 6 is a fragmentary horizontal section of one of the clips whereby the rear runner is connected with the rear portion of the main frame. Fig. 7 is a cross-section in line 7 7, Fig. 6. Fig. 8 is a fragmentary plan view showing the clasp whereby the ends of the gripper-band are secured together when placed on the tire. Fig. 9 is a longitudinal section in line 9 9, Fig. 8.

Like letters of reference refer to like parts in the several figures.

Although my improvements are applicable to various forms of velocipedes, I have shown the same applied to a bicycle which consists, essentially, of a front or steering wheel A, a rear or driving wheel B, a steering-fork C, and a main frame D, connecting the axle of the rear wheel with the steering-fork.

E represents a front runner, which is pivotally connected with the front fork, so that it can be swung underneath the front wheel when it is desired to use the runner instead of the wheel or swung upwardly over the front wheel when it is desired to use the latter.

$e\ e$ represent inclined connecting-rods whereby the front runner is connected with the front fork. Two of these rods are arranged in an upwardly-converging position on each side of the wheel and pivoted with their lower ends to the runner. The upper ends of the rods are provided with eyes $e$, which are both pivotally secured to a clip F by a transverse boss $f$, formed on said clip and passing through both eyes, and a screw $f'$, whereby the eyes are confined on said boss. This clip has the form of the letter U and embraces one member of the front fork adjacent to the axle of the front wheel. $f^2$ is a filling-block bearing against the fork between the arms of the clip, and $f^3$ is a screw which passes through the filling-block and the arms of the clip and whereby these parts are secured to the fork. Each of the connecting-rods is preferably made in two sections which telescope and which are adjustably connected, so that the runner can be adjusted for wheels of different diameters. The eccentric arrangement of the pivotal connection between the rods and the front fork enables the runner to bear against the lower portion of the front wheel when the runner is lowered into its operative position, as shown in full lines in Fig. 1, and to clear the front wheel when the runner is raised into its inoperative position. (Shown in dotted lines, Fig. 1.) The front runner may be held in its elevated position by any suitable means, preferably by a hook $g$, pivoted on the steering-head of the frame and engaging with the front portion of the runner, as shown in dotted lines, Fig. 1.

H H represent two rear runners arranged lengthwise on opposite sides of the rear wheel and connected at their united front ends by a rod $i$ with the lower front member of the main frame.

J J represent two telescopic connecting-rods whereby the rear runners are connected with the rear portion of the main frame in substantially the same manner as the front connecting-rods are connected with the front runner and fork. A pair of these rods are arranged in an upwardly-converging position on each side of the rear wheel and pivoted with their lower ends to one of the runners. The upper ends of the rods are provided with eyes $j$, which are attached to a clip $k$ by a boss $k'$, formed on the clip and passing through said eyes, and a screw $k^2$, whereby the eyes are confined on said boss. This clip is of U form and embraces the lower rear member of the main frame.

L represents a dovetail clamping-block which is arranged between the jaws of the clip and engaging with its end in dovetail or undercut notches $l$, formed in the inner sides of said arms.

$l'$ is a clamping-screw which is arranged in a screw-threaded opening in the clamping-block and which bears against the adjacent portion of the main frame for clamping the clip against the same.

M represents the gripper-band, which is removably secured to the outer side of the tire and which is provided on its outer side at intervals with teeth $m$, which enable the rear wheel to obtain a firm grip upon the snow or ice for propelling the bicycle over the same. The band is divided to permit the same to be conveniently applied to or removed from the tire, and is provided on the opposing ends of its split portion with hooks $m'$ and eyes $m^2$, whereby they are engaged for securing the split ends of the band together. The gripper-band is fastened at intervals to the tire and rim of the wheel by metallic straps N, which are secured with their central portions to the inner side of the gripper-band and which are passed around the tire and rim from opposite sides and lap one over the other on the inner side of the rim. The overlapping portion of each strap is provided with longitudinal slots $n$, through which a clamping-bolt $n'$ passes.

O represents retaining-plates whereby the gripper-band is prevented from becoming displaced on the tire, one of these plates being arranged on one side of the overlapping portion of each strap and at an angle or transversely thereto. Each of the retaining-plates is provided at its ends with notches $o'$, which receive the adjacent spokes of the wheel for preventing the plate from moving laterally on the inner side of the rim, and in its central portion with a longitudinal slot $o^2$, through which the clamping-bolt $n'$ passes. When the clamping-bolt is loose, the two ends of the fastening-strap may be firmly drawn together and shifted on the retaining-plate until the parts are in their proper position, and upon tightening the clamping-bolt these parts are held both against longitudinal and transverse displacement on the tire and rim.

I claim as my invention—

1. The combination with a gripper-band adapted to be placed around a wheel-tire, of fastening-straps secured to the gripper-band, each of said straps being adapted to pass around the tire and rim of a wheel and provided in its end portions with slots and a clamping-bolt passing through the slots of the strap, substantially as set forth.

2. The combination with a gripper-band adapted to be placed around a wheel-tire, of fastening-straps secured to the gripper-band, each of said straps being adapted to pass around the tire and rim of a wheel and provided in its end portions with slots, a retaining-plate provided with notches in its ends which are adapted to receive the spokes of the wheel and with a slot in its central portion and a clamping-bolt passing through the slots of the strap and retaining-plate, substantially as set forth.

Witness my hand this 21st day of March, 1896.

PAUL BIETH.

Witnesses:
THEO. L. POPP,
JNO. J. BONNER.